UNITED STATES PATENT OFFICE.

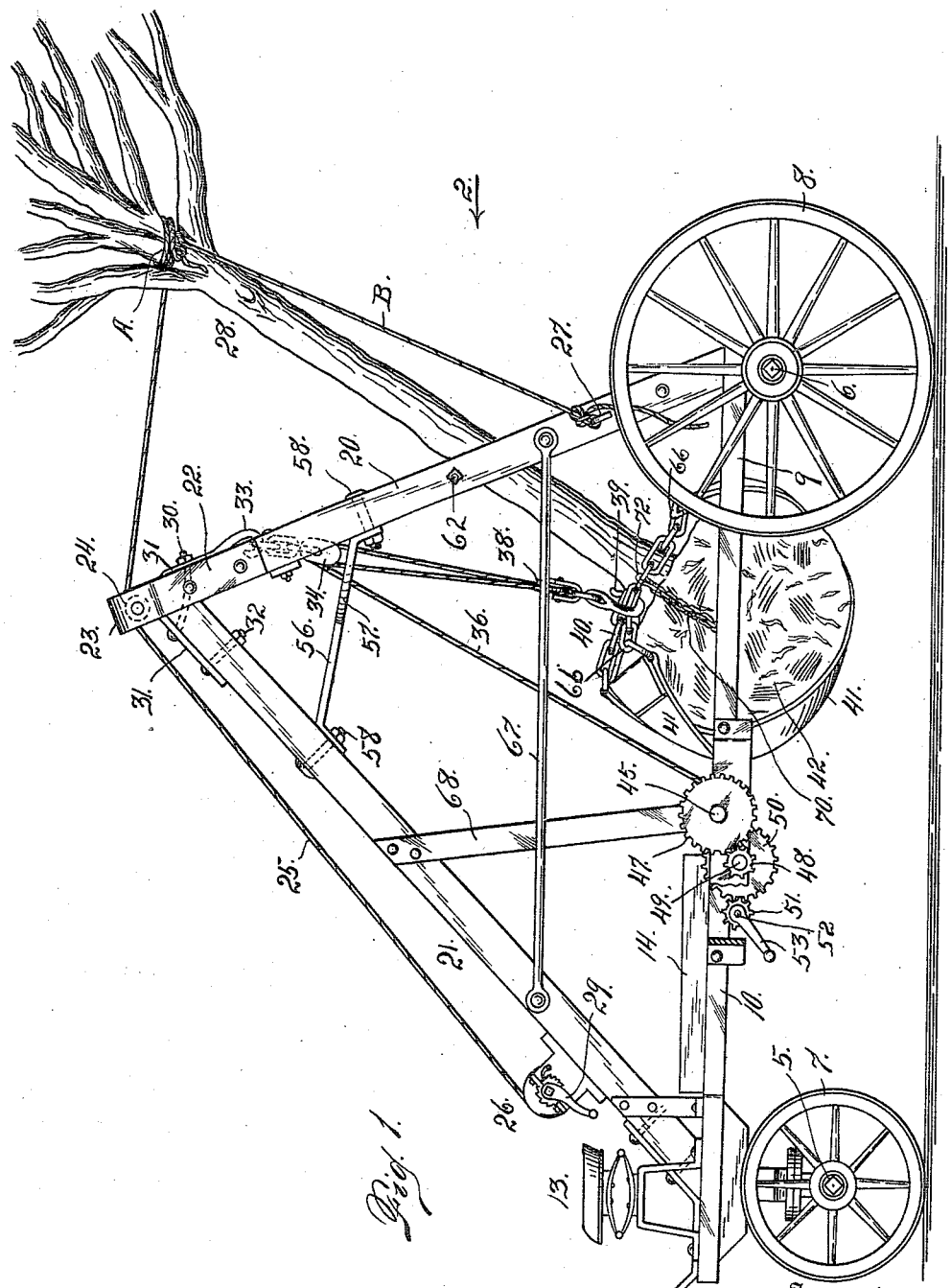

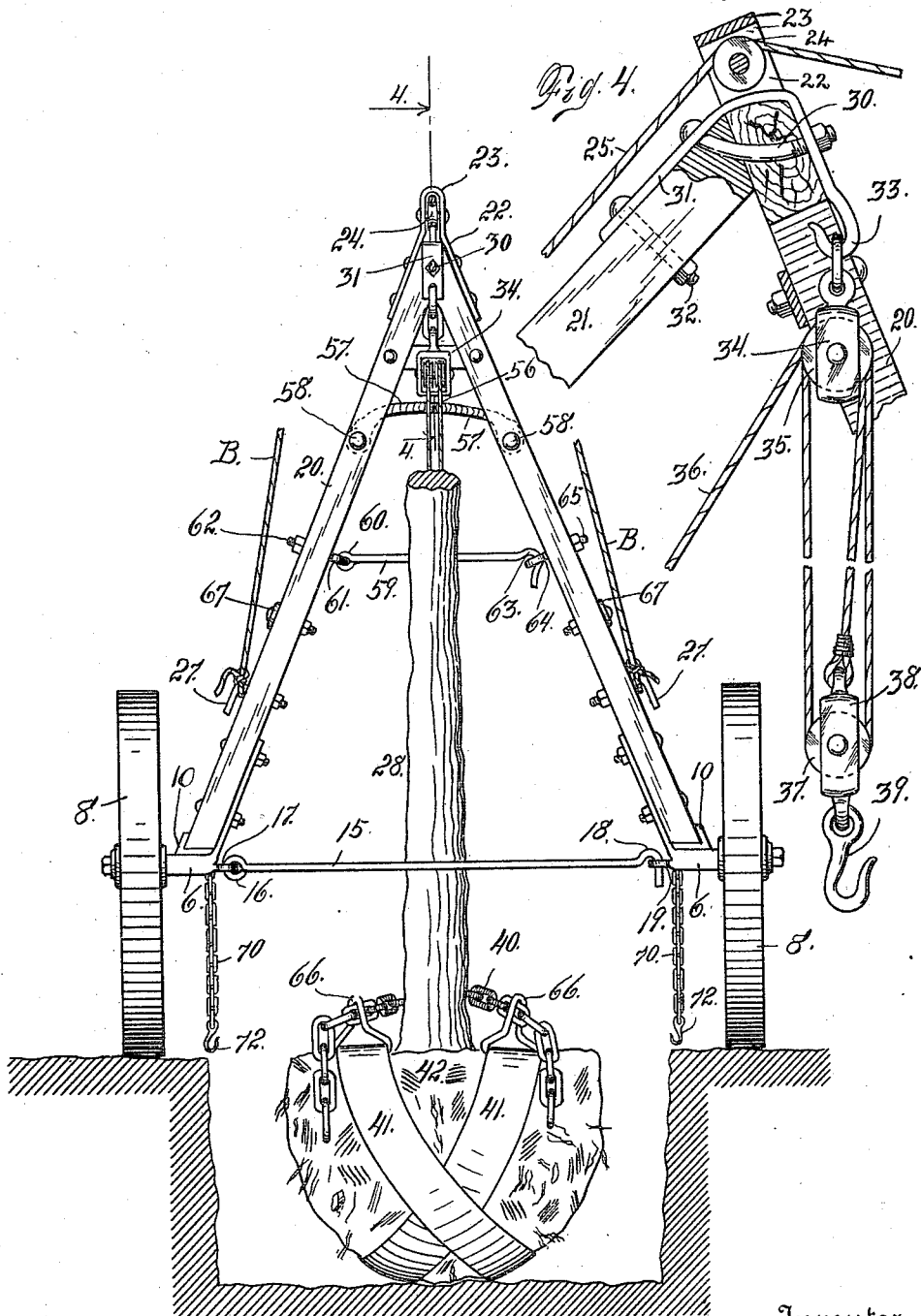

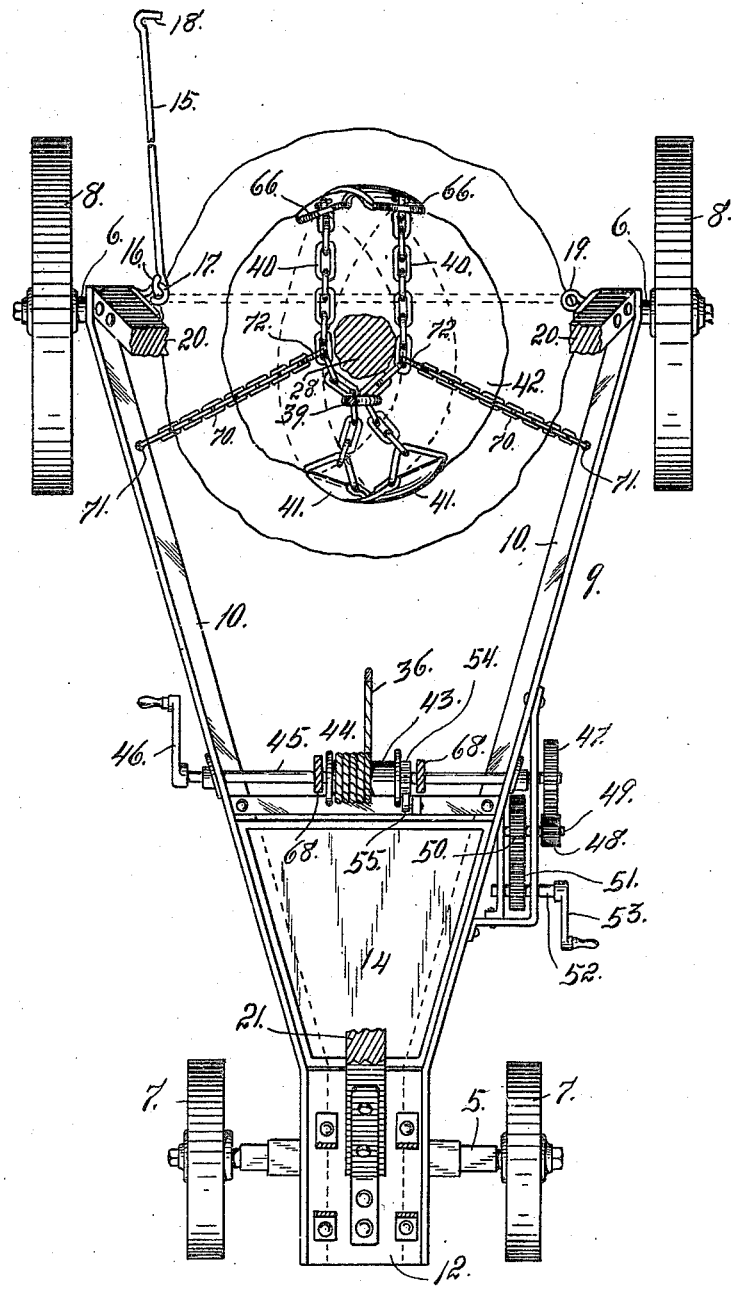

ALFRED HILL, OF DENVER, COLORADO, ASSIGNOR OF ONE-HALF TO JOHN B. SPUHR, OF DENVER, COLORADO.

MACHINE FOR TRANSPLANTING TREES.

986,390. Specification of Letters Patent. Patented Mar. 7, 1911.

Application filed December 14, 1908. Serial No. 467,409.

*To all whom it may concern:*

Be it known that I, ALFRED HILL, a citizen of the United States, residing in the city and county of Denver and State of Colorado, have invented certain new and useful Improvements in Machines for Transplanting Trees; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in tree transplanting apparatus, my object being to provide a construction of this class which shall be adapted to facilitate the work of handling large trees for transplanting purposes.

It is well known that in transplanting large trees, several tons of dirt are oftentimes clinging to the roots of the tree when it is removed from the location of its growth, and this is necessary in order that trees of large growth may be transplanted with safety. Under ordinary circumstances the work of removing a tree and carrying it any considerable distance is very slow and difficult.

The object of my invention is to overcome the difficulties of this work and provide means whereby the tree may be readily lifted after it has been loosened, and suspended upon a frame mounted upon wheels. The lifting of the tree with its load of dirt is accomplished through the medium of a winch, windlass or suitable hoisting mechanism, carried by the vehicle. In my improved construction two winches are employed, one for operating a cable connected with a sort of harness attached to the large ball of dirt clinging to the root of the tree, while the other winch operates a rope or cable, connected with the body of the tree at a suitable distance above the root, whereby this body portion may be held at the desired angle. In the case of trees of considerable height, it is often necessary to lower the top of the tree in order to pass under wires or arches, and this may be quickly accomplished by the manipulation of one of the winches, being that operating the cable connected with the body of the tree above the root.

Having briefly outlined my improved construction, I will proceed to describe the same in detail, reference being made to the accompanying drawing in which is illustrated an embodiment thereof.

In this drawing, Figure 1 is a side elevation of my improved tree transplanting apparatus, showing a tree in place and swung above the vehicle. Fig. 2 is a rear elevation of the apparatus, or a view looking in the direction of arrow 2 Fig. 1, the tree being partly broken away. Fig. 3 is a top plan view of the apparatus with its upper portion broken away, to better disclose the main winch, together with the harness applied to the root of the tree. Fig. 4 is a section taken on the line 4—4 Fig. 2 looking in the direction of the arrow.

The same reference characters indicate the same parts in all the views.

Let the numeral 5 designate the front axle, 6, 6 rear stub axles; 7, 7 the front wheels, and 8, 8 the rear wheels of a vehicle provided with a horizontally disposed framework 9 composed of side bars 10 whose rear extremities are connected with the stub axles 6, while their forward extremities are connected with a vertically located platform 12 mounted upon the front axle, and forming a support for the driver's seat 13. In the rear of the seat is located a box 14 adapted to hold the necessary tools employed for transplanting purposes. The bars 10 approach each other as they extend forwardly from the rear axles, so that the platform 12 is relatively narrow, while the forward axle 5 is relatively short, the front wheels 7 being much nearer together than the rear wheels 8. It is important that the rear wheels shall be separated a suitable distance, since the large ball formed by the root of the tree and the dirt clinging thereto, must be raised between the rear wheels. The stub axles 6 are connected by a transverse rod 15, one extremity of which has an eye 16 engaging a similar eye 17 with which one stub axle is provided, while the other extremity of the rod is provided with a hook 18 adapted to connect with an eye 19 with which the opposite stub axle is provided.

Upon the framework of the vehicle is mounted a sort of derrick or hoisting frame, composed of two bars 20 whose lower extremities are respectively connected with the stub axles 6; and a third bar 21 whose lower extremity is connected with the vertically located platform 12. The two bars 20 approach each other as they extend upwardly from the stub axles, and are also forwardly inclined, while the bar 21 is rearwardly inclined as it extends upwardly. These three bars are suitably connected together at their upper extremities. As shown in the drawing, a metal plate 22 has its extremities attached to the upper extremities of the bars 20, which are beveled to engage each other. This metal plate forms a loop 23 above the apex of the bars 20, and in this loop is mounted a pulley 24 over which a cable 25 passes. One extremity of this cable is connected with a winch 26 mounted upon the bar 21 near the base thereof, while its other extremity is connected with the tree 28 just above the lower limbs thereof, as shown at A. Two other cables designated B are respectively connected with hooks 27 attached to the bars 20 near the base thereof, while their opposite extremities are connected with the tree at the same point as the cable 25. It is evident that by manipulating the winch 26, which is provided with a hand crank 29 for the purpose, the top of the tree may be raised and lowered at will, assuming that the root is free. The three bars 20, 20 and 21 are further connected at the top by a curved bolt 30, and also by a metal strap 31, one extremity of which is secured to the top of the bar 21 by a bolt 32, while its other extremity is formed into a hook 33 occupying a position in the crotch of the two bars 20. The curved bolt 30 passes through the strap 31 twice, the said strap having a bend at its top and the bolt 30 being passed through its two members below the bend. This gives the structure great strength and security.

From the hook 33 is suspended a block 34 carrying a pulley 35, to which leads a cable 36, passing around a second pulley 37, the extremity of the cable being connected with the block 38 in which the pulley 37 is mounted. The block 38 is provided with a hook 39 adapted to be connected with a chain 40 which connects the extremities of the two bands 41, which, together with the chain, constitute the harness for the ball 42 composed of the tree root and the dirt clinging thereto. The opposite extremity of this cable is connected with a drum 43 forming a part of the main winch 44, having a shaft 45 upon which the drum is mounted. One extremity of this shaft is provided with a hand crank 46 while its opposite extremity is provided with a gear 47 meshing with a pinion 48 fast on a shaft 49 carrying a larger gear 50, meshing with an additional gear 51 fast on a shaft 52 having a hand crank 53. The drum 43 is provided with a ratchet 54 adapted to be engaged by a pawl 55, whereby the drum may be locked whenever the power applied to the winding shaft ceases to act.

The three bars 20, 20 and 21, constituting the derrick or hoisting framework of the vehicle, are further connected near the top thereof by a brace bar 56, one extremity of which is connected with the bar 21 by a bolt 58. The opposite extremity of the brace 56 is bifurcated and its two members 57 are respectively connected with the bars 20 by bolts 58. The two bars 20 are connected together intermediate their extremities by a rod 59, one extremity of which has an eye 60 engaging the eye 61 of a bolt 62, passed through one of the bars 20, while the opposite extremity of the rod is provided with a hook 63 which engages an eye 64 formed on a bolt 65 with which the other bar 20 is provided.

From the foregoing description the use and operation of my improved tree transplanting apparatus will be readily understood. In order to use the apparatus it is, of course, necessary that the tree is loosened from the ground, which is done by digging around the root at a sufficient distance therefrom, so that when the tree is loosened a sufficiently large quantity of dirt will cling to the root, so that after the tree is removed to its new location there will be no danger of losing it. The bands 41 are then passed around the ball 42, the extremities of the bands being provided with metal loops or shackles 66. These shackles are then connected by the chain 40 to which the hook 39 is attached, the said hook being connected with the cable 36 of the main winch, as heretofore explained. The cable 25 and the two cables B are then connected with the body of the tree at any desired distance from the root, the connection of the last named cables being sufficiently loose to make allowance for the raising of the tree out of the ground. The main winch is then operated until the ball 42 is lifted clear from the ground, as shown in Fig. 1. When this is done it may be assumed that the cable 25 and the two cables B hold the tree in the position shown in the last named figure. The tree is then in position to be moved upon the vehicle to the location where it is to be transplanted. When this is done the vehicle is driven to such a position that the ball of the tree will be immediately above the hole in which it is to be placed. The main winch is then released and the drum 43 allowed to unwind until the ball 42 settles into the new hole. If the body of the tree is not then erect, the winch 26 may be operated to bring it into this position where it may be held until the dirt is packed around it so that it shall be self-supporting.

It will be understood that if during the journey a telegraph wire, a trolley wire or an arch should be encountered, which would be sufficiently low to engage the top of the tree, the latter may be quickly lowered by loosening the winch 26 until the tree passed under the wire or arch, after which it may be raised to the desired or any suitable position.

In order to increase the strength and security of the hoisting frame, the latter is provided on opposite sides with two rods 67 which connect the front frame bar 21 with the rear frame bars 20. The front frame bar 21 is also provided with a depending arm 68 which engages the shaft 45 of the main winch intermediate its extremities and forms an additional support therefor.

In order to prevent the possible lateral swinging or oscillating movement of the ball of the tree between the side bars 10 of the frame during the operation of carrying the tree from its original locality to the place where it is to be planted, I preferably employ two chains 70 which are respectively connected with the side bars 10 of the vehicle frame, as shown at 71, their opposite extremities being equipped with hooks 72 adapted to be connected with links of the chain 40. In Fig. 2 these chains are shown hanging downwardly from the frame, since they are not used until the ball of the tree is lifted or suspended above the surface of the ground for transporting purposes. As soon as the ball of the tree is raised to the desired position, the hooks 72 of the chain 70 may be connected with the chain 40 on opposite sides, as shown in Fig. 3.

Having thus described my invention, what I claim is:

1. The combination of a vehicle having rear stub axles, the said axles being separated, a frame mounted on the vehicle and composed of two bars connected with the respective stub axles at their lower extremities and extending upwardly therefrom, the said bars approaching each other as they extend upwardly, a third bar extending upwardly from the front portion of the vehicle, its upper extremity forming a union with the rearwardly located frame bars, a main winch mounted upon the frame, a harness adapted to be applied to the ball of the tree, a cable connection between the said harness and the winch, means mounted on the frame for supporting and guiding the cable, a second winch also mounted on the frame, means for connecting the last named winch with the tree above the root, and other means for connecting the body of the tree above the root with the rearwardly located bars of the hoisting frame, substantially as described.

2. In an apparatus of the class described, the combination of a vehicle having separated stub axles upon which the rear wheels are mounted, frame bars extending upwardly from each stub axle, the said bars approaching each other as they leave the axles, a third bar whose lower extremity is mounted upon the front part of the vehicle, the said bar extending upwardly and rearwardly, its upper extremity being connected with the upward extremities of the rearwardly located bars, a rod forming a connection between the stub axles, one extremity of the rod being movably connected with one stub axle, while its opposite extremity is detachably connected with the other stub axle, and means mounted upon the hoisting frame for handling a tree to be transplanted, substantially as described.

3. In an apparatus of the class described, the combination with a hoisting vehicle frame having separated stub axles upon which the rear wheels are mounted, bars extending forwardly from the stub axles, the said bars being inclined forwardly and approaching each other as they leave the axles, and a third bar whose extremities are mounted upon the front part of the vehicle, the said bar extending upwardly and rearwardly and having its upper extremity connected with the upper extremities of the rearwardly located bars, a rod pivoted at one extremity to one of the stub axles and movably connected with the other stub axle, the said rod forming a connection between the stub axles, and means mounted on the hoisting frame for handling the plant to be transplanted, substantially as described.

4. In a transplanter, the combination with a vehicle, of a hoisting frame mounted thereon, a main winch mounted upon the frame, a harness adapted to be applied to the tree, a cable connection between the said harness and the winch, means mounted on the frame for supporting and guiding the cable, a second winch also mounted on the frame, means for connecting the last-named winch to the tree above the root, and other means for connecting the body of the tree above the root with the rearwardly located bars of the hoisting frame, substantially as described.

In testimony whereof I affix my signature in presence of two witnesses.

ALFRED HILL.

Witnesses:
A. J. O'BRIEN,
ALICE I. LAKIN.

---

Copies of this patent may be obtained for five cents each, by addressing the "Commissioner of Patents, Washington, D. C."